June 12, 1956  J. W. ANDERSON  2,750,582
TOOL FEED TIMER
Filed Feb. 18, 1955  2 Sheets-Sheet 1
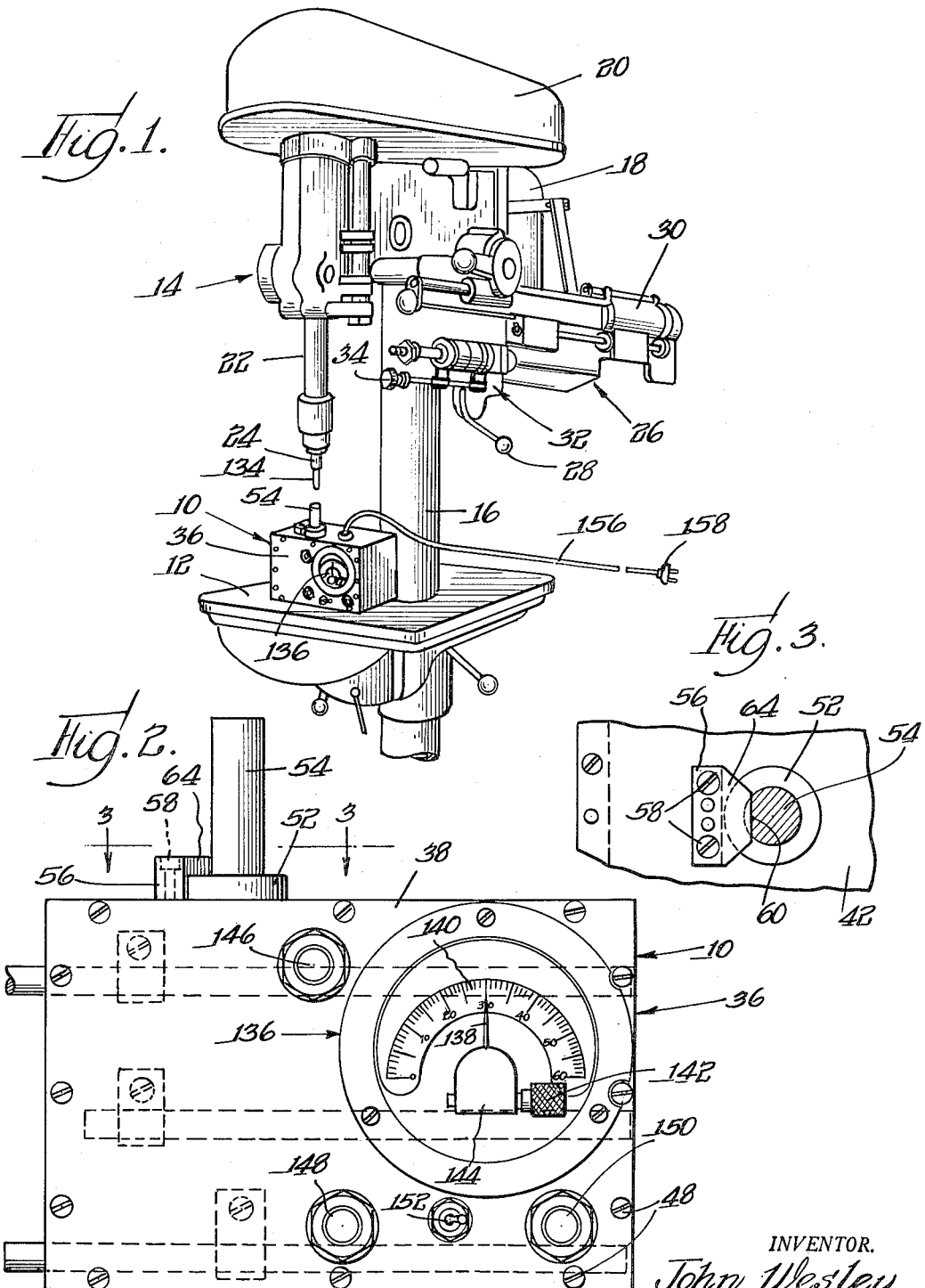
INVENTOR.
John Wesley Anderson
BY Olson & Trexler
Attys.

June 12, 1956
J. W. ANDERSON
2,750,582
TOOL FEED TIMER
Filed Feb. 18, 1955
2 Sheets-Sheet 2
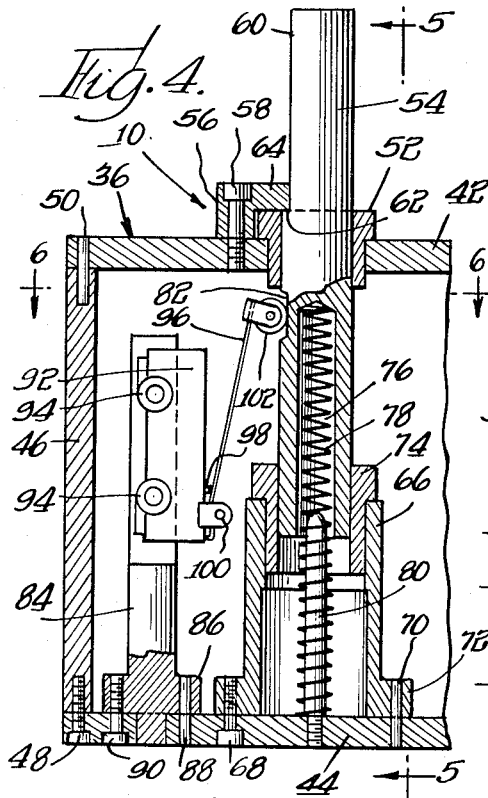
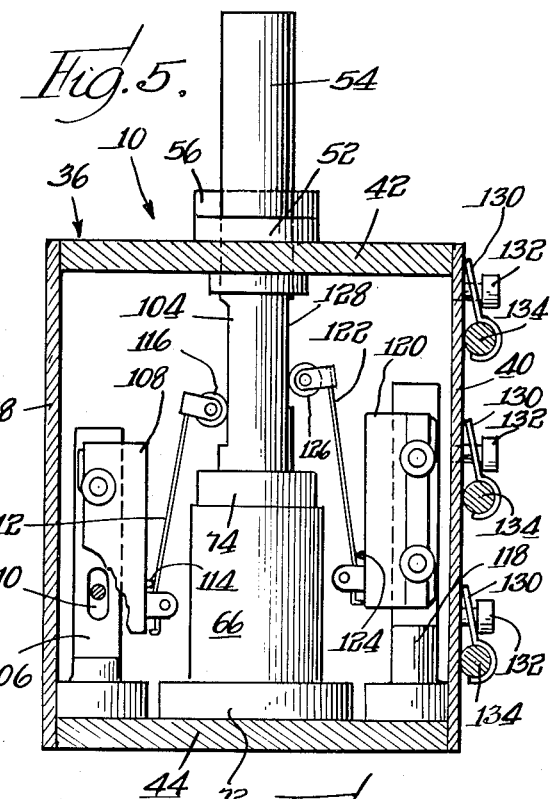
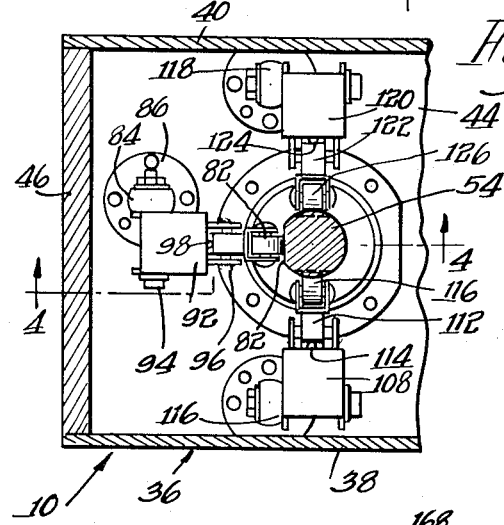
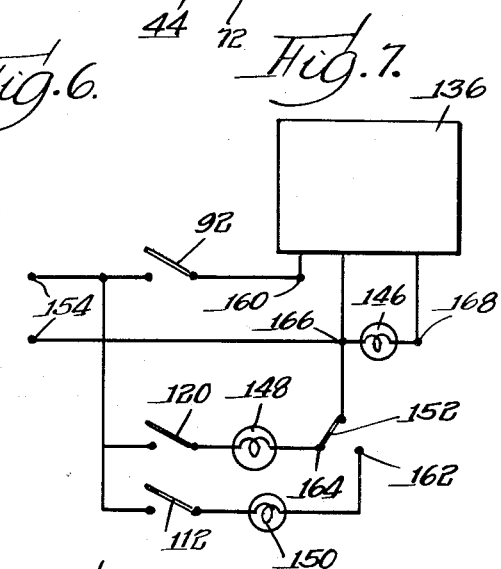
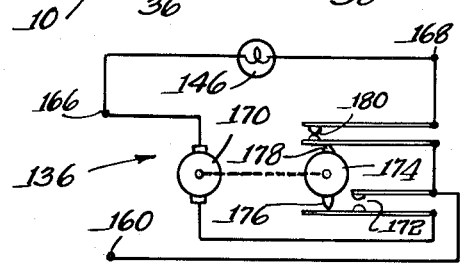
INVENTOR.
John Wesley Anderson
BY
Olson & Trexler
attys.

United States Patent Office 2,750,582
Patented June 12, 1956

2,750,582

TOOL FEED TIMER

John Wesley Anderson, Philadelphia, Pa., assignor to Teleflex Incorporated, North Wales, Pa., a corporation of Delaware Application February 18, 1955, Serial No. 489,255

16 Claims. (Cl. 340—268)

This invention is concerned generally with the art of machine tools, and more specifically with a tool feed timer.

In order to obtain the best results with any power driven cutting tool such as a drill, reamer, milling cutter, etc., it is necessary that the rate of feed of the tool be set to the correct feed for the material to be cut and for the relative surface speed of the cutting tool and the workpiece. The correct rate of feed for various materials has been worked out in terms of inches per minute or inches per revolution of the tool and bears a direct relationship to the surface speed per minute of the tool relative to the workpiece. Correct tool feed setting results in a better surface finish with closer tolerances and consequent higher quality of the finished product, and further results in maximum tool life.

Most pneumatic or pneumatic-hydraulic power driven machines do not incorporate a built-in tool feed timer by means of which a predetermined rate of tool feed can be set accurately. These machines are set as to feed rate in accordance with various shop practices which attain less than perfect results. For example, the rate of tool feed may be set by touch. This, of course, depends critically on the operator setting up the job. This method is inefficient inasmuch as the operator may set the feed too slow with the result that the tool is burned, and less pieces per hour are produced.

Other times, the rate of tool feed may be set to a maximum. The extreme maximum is determined by the heating up or smoking of the tool, and the rate of feed then is slowed down below this point. This is inefficient inasmuch as the tool is likely to be damaged by overheating at the extreme maximum feed speed, and the subsequent slowing down to a lesser feed rate is still likely to result in an improper rate of feed.

It is possible that the rate of tool feed might be set by using a watch with a second hand. In this case, the operator would have to try to time a predetermined length of movement of the tool spindle. This procedure is extremely difficult to use as there is no physical connection between the watch and the tool spindle, and the timing relies on the operator's sight and estimation of position as well as it does on the watch and predetermined length of movement. It is practically impossible to set tool feeds by this method when the time of operation is of a few seconds' duration.

Furthermore, there are occasions when the rate of feed of special tools, or tools used with special materials, must be determined by experiment alone. In this case, it would be desirable accurately to determine the rate of feed for proper recording so that the set-up could be repeated with accuracy. Unfortunately, there has been no satisfactory apparatus or method in the prior art for determining feed rate of tools when the feed rate has been set by experiment.

In view of the foregoing, it is an object of this invention to provide a device for accurately setting the correct rate of tool feed on machines in which feed controls are not built into the machine.

Furthermore, it is an object of this invention to provide a device for accurately measuring the rate of tool feed of a machine that has been set up by experiment.

More specifically, it is an object of this invention to provide a device for measuring tool feed rates which does not depend on the operator for proper timing.

Yet another object of this invention is to provide a device for measuring tool feed rate which provides a visible indication of such feed rate.

A further object of this invention is to provide a device for timing tool feed rate which does not require complicated attachment to a machine tool, but merely need be positioned in line with the moving tool or tool carrier.

Another object of this invention is to provide a device for measuring tool feed rate which is adjustable for measuring the feed over different lengths of travel in accordance with the feed rate of the tool to be set.

Other and further objects and advantages of the present invention will be apparent from the following description when taken in connection with the accompanying drawings, wherein:

Fig. 1 is a perspective view of a drill press with my timing device in place thereon;

Fig. 2 is a front elevational view of the timing device;

Fig. 3 is a fragmentary top view partially in cross section as taken along the line 3—3 in Fig. 2;

Fig. 4 is a fragmentary vertical cross sectional view as taken along the line 4—4 in Fig. 6;

Fig. 5 is a vertical cross sectional view taken at right angles to Fig. 4 and along the line 5—5 in Fig. 4;

Fig. 6 is a horizontal sectional view taken along the line 6—6 in Fig. 4;

Fig. 7 is a schematic wiring diagram of the device; and

Fig. 8 is a further schematic wiring diagram of a portion of the device shown in block in Fig. 7.

Referring first to Fig. 1, a tool feed timer or timing device 10 will be seen placed on the work table 12 of a drill press identified generally by the numeral 14. The drill press may be of any standard type, and a drill press has been chosen only as an illustrative embodiment inasmuch as the timer is capable of use with any of a variety of machine tools. In the drill press herein shown by way of illustration, the table 12 is vertically adjustable on a standard 16, and various parts of the power mechanism including a motor 18, a cover 20 over the pulleys and drive belts, and a spindle 22 are supported on top of the column. The spindle 22 is provided at its lowermost end with a chuck 24 and is adapted for vertical reciprocation in addition to rotation.

The drill press 14 is of the type originally manufactured for manual feed by means of a lever actuating a rack and pinion device. Such a drill press, of course, depends upon the operator using it for its feed rate, and the drill press shown has been modified by the addition of a pneumatic drill press feed device 26 of the type manufactured by the Bellows Company of Akron, Ohio. This type of drill press feed device is well known in the art and needs little description. However, it might be stated that the device includes a starting control handle 28, and a pneumatic motor 30. This motor acts through a suitable rack and pinion device (not shown) to control the vertical movement of the spindle 22 and the chuck 24. A speed control device 32 known as the "Hydro-Check" is provided. This has a feed rate control 34 for adjusting the "Hydro-Check" accurately to determine the feed rate of the drill press as effected by the pneumatic motor of the pneumatic drill press feed device. This feed rate as controlled by the "Hydro-Check" is infinitely variable, but is not readable, and therefore a predetermined setting cannot be attained accurately.

The tool feed timer 10 comprises a case 36 which conveniently is rectangular in configuration. The case comprises a front panel 38 and a rear panel 40 which preferably are formed of ⅛ inch thick cold rolled steel. The case further includes a top plate or panel 42, a bottom plate or panel 44, and end plates or panels 46, all of ⁵⁄₁₆ inch cold rolled steel. The various plates or panels are assembled by means of conventional fasteners including machine screws or bolts 48 and dowel pins 50.

A bushing 52 is mounted in an aperture in the top plate or panel 42 of the case or housing 36 and is held in place by any suitable means, such as by threads or by a press fit. A generally cylindrical plunger 54 is mounted in the bushing 52 for vertical movement, and is limited in its upward movement by an L-shaped bracket 56 mounted on the top plate or panel 42 by means such as a pair of countersunk or socket head screws 58. The plunger 54 is provided along one side with a flat 60 providing a stop shoulder 62. A shelf or ledge 64, the outline of which may be seen in Fig. 3, forming a portion of the L-shaped bracket 56, extends above the top of the bushing 52 and into position adjacent the flat 60, overlying the shoulder 62 to form an upper limit stop therefor. The front face of the bracket 56 against the flat 60 positively precludes rotation of the plunger 54.

A hollow pedestal 66 is positioned in alignment with the plunger 54 and is secured to the base by means of socket head screws 68 and dowel pins 70 extending into a peripheral flange 72 on the pedestal. A bushing 74 generally similar to the bushing 52 is mounted in the top of the pedestal 66 and slidably receives the plunger 54. The plunger 54 is provided in its lower end with an axial bore 76, and a spring 78 fits within this bore and abuts the top of the base plate or panel 44 to urge the plunger 54 up against the stop 64 of the L-shaped bracket 56. A pin 80 is threaded into the bottom plate or panel 44 and extends up into the axial bore 76 of the plunger for locating the lower portion of the spring 78.

The plunger 54 is provided inside of the case or housing 36 with a flat 82 (Fig. 4) of rather short axial length. Spaced from the pedestal 66 on the same side as the flat 82 there is provided an upstanding post 84 having a circumferential base flange 86. A dowel pin 88 and socket head screws 90 pass through the base plate 44 and into the flange 86 to secure the post in position parallel to the pedestal 66 and plunger 54. A switch 92 of the type known as a "microswitch" is mounted on the post 84 for vertical adjustment thereon by means of a pair of bolts 94 passing through vertical slots (not shown) in the post 84. A switch arm 96 engageable with the switch actuator 98 is pivotally mounted on the switch 92 at 100 and carries a roller 102 on its outer end. In the position shown in Fig. 4 with the roller engaging the flat 82, the switch 92 is open. However, when the plunger 54 is depressed against the spring 78, the roller leaves the flat 82 and the switch 92 is closed to energize a timer hereinafter to be described.

The plunger 54 is provided with a second flat 104 displaced 90° from the flat 82 and of relatively great length. A post 106 similar to the post 84 supports a "Microswitch" 108 by the same bolt and slot connection as the switch 92 is supported, and one of the vertical slots 110 is shown in Fig. 5. A pivoted arm 112 on the switch 108 engages the switch actuator 114, and a roller 116 carried by the arm 112 engages the flat 104.

A third post 118 is positioned opposite to the post 106 and likewise adjustably carries a switch 120 of the "Microswitch" type. A pivoted arm 122 on the switch 120 engages the switch actuator 124, and a roller 126 on the end of the arm engages a flat 128 opposite to the flat 104 and of substantially lesser length.

It will be observed that there is provided on the back plate or panel 40 a plurality of clips or brackets 130 secured by any suitable means such as socket head screws 132 detachably to mount drill rods 134 of different lengths for use in the chuck 24 of the drill press and engageable with the plunger 54 to measure the rate of tool feed.

On the front of the case or housing 36 there is provided a timer 136 which is shown physically in Fig. 2 and schematically in Figs. 7 and 8. This timer may be of any suitable or known type capable of completing a circuit after the elapse of a predetermined time. The specific timer shown in Fig. 2 is provided with two pointers 138 movable across a scale 140 marked in seconds up to 60 seconds. A knurled knob 142 on the front of the timer acts through a suitable mechanism 144 to preset the pointers to any desirable timing time up to 60 seconds toward the zero point. When the pointer reaches position which is determined in accordance with charts established in accordance with the desired feed rate depending on the type of material and the rotational speed of the drill bit or other cutting tool. At the start of a timing cycle, the second pointer starts counting the seconds toward the zero point. When the pointer reaches the zero point, a circuit is completed to cause a light to light up, and the pointer returns to its original position.

Before referring to the internal construction of the timer, reference should be had to an indicator light 146 on the front panel 38. The indicator light 146 preferably comprises a neon bulb of conventional construction mounted in a suitable aperture in the panel 38 by means of a conventional fitting. The indicator light 146 is associated with the timer 136 as hereinafter will be brought out in detail, and is so connected that it will light up following the expiration of the predetermined time set on the timer.

Toward the bottom of the front panel 38 there is provided an indicator light 148 and an indicator light 150. These two indicator lights likewise may be neon bulbs of conventional construction and mounted by means of conventional fittings. A two position toggle switch 152 is mounted between the indicator lights 148 and 150, and is thrown in one or the other direction in accordance with which of the indicator lights 148 and 150 is to be used. These two indicator lights respectively are designed to light up after one-half inch or one inch of travel of the plunger 54. The exact operation of the three indicator lights best will be understood with reference to Figs. 7 and 8 which comprise wiring diagrams of the tool feed timer.

Connections to the flexible line cord are indicated at 154 in Fig. 7. The flexible lead line itself may be seen in Fig. 1 wherein it is indicated by the numeral 156. The flexible lead line extends from the top of the tool feed timer 10 to a conventional plug 158. One of the connection 154 is connected through the "Microswitch" 92 to a terminal 160 of the timer. This same connection is connected through the switches 112 and 120 respectively in series with the indicator lights 150 and 148 to the fixed terminals 162 and 164 of the toggle switch 152. This toggle switch in turn is connected to a terminal 166 of the timer 132. A wire connects the terminal 166 with the opposite one of the connectors 154. The third indicator light 146 is connected between the terminal 166 and another terminal 168 of the timer.

The internal construction of the time 136 may vary widely and is shown as comprising a constant speed motor 170 such as a synchronous motor. One terminal of the motor is connected directly to the terminal 166. The other side of the motor is connected through a normally closed switch 172 to the terminal 160. A cam 174 is driven at reduced speed by the motor 170 by means such as a geared speed reducing mechanism. The cam 174 is provided with a lobe 176 for opening the switch 172 at the end of a timing operation to stop the operation of the timer.

The cam 174 also is provided with a lobe 178 which is shown as being displaced 180° from the lobe 176. The lobe is arranged to close the contacts of a switch 180 at the same time the contacts of the switch 172 are opened.

The switch 180 is connected between terminal 160 and the terminal 168 so as to complete a circuit through the indicating light 146 at the end of a timing operation.

In order to use the tool feed timer to measure the rate of tool feed of a machine tool such as the drill press 14, timer 10 is placed on or secured to a fixed part of the machine such as the work table 12 of the drill press. One of the drill rods 134 of an appropriate length is removed from the back of the tool feed timer and is inserted in the tool holder of the machine, the chuck 24 in the illustrative embodiment. The length of time that it should take for the tool to travel either one inch or one-half inch is ascertained from a suitable chart, and the switch 152 is thrown in the appropriate direction to measure either one-half inch or one inch of tool feed travel. The time is set on the timer 136, and the machine is set in operation as by pulling the handle 28.

The drill rod 134 engages the top of the plunger 54 and forces it down against the spring 78. As the roller 102 rises from the flat 82 on the plunger, the switch 92 is closed and the timer 136 is started in operation. After one-half inch of further depression of the plunger, the roller 126 leaves the flat 128, and after a further half inch of depression, this being a total of one inch of travel, the roller 116 leaves the flat 104. Whichever of the switches 120 and 108 is connected in circuit by the toggle switch 152 causes the corresponding indicator light 148 or 150 to light up. The object is for the selected one of these two indicator lights to light up at the same time as the timer light 146 lights up. If the "travel" light associated with the plunger lights up before or after the timer light 146, then the feed rate is either too slow or too fast, and the "Hydro-Check" is adjusted and the machine is run through another cycle of operation. After a few cycles, the selected "travel" light will light up at the same time as the timer light, and the machine then will be adjusted for the proper tool feed rate.

The tool feed timer then is removed from the machine, the drill rod is removed from the tool holder, and an appropriate tool is substituted therefor. The machine then is ready for operation at the proper rate of feed.

The tool feed timer is used in an analogous manner to ascertain the feed rate of a machine wherein the feed rate has been found experimentally. Generally speaking, one of the drill rods 134 would be substituted for the tool and the timer 10 would be placed on the table 12 as before. It may be that in some instances it would not be desirable to remove the fixture from the table or the tool from the work spindle. In this case, a bracket would be clamped on the tool spindle so that the plunger on the control could be operated to the last one and one-half inch stroke of the tool spindle. The timer would not necessarily be directly under the spindle as long as the bracket was sufficiently sturdy to prevent deflection under load.

Preferably, only the last one and one-half inch of stroke of the tool would be used so as to avoid damage either to the machine or to the timer such as might occur if the tool continued to travel after the completion of a timing operation. The machine would be cycled and the last one and one-half inch travel of the tool spindle would be timed roughly so that the proper "travel" light 148 or 150 could be selected. If this time would be less than 60 seconds, then the indicator light 150 would be used, whereas the light 148 would be used if the time were more than 60 seconds.

The timer would be set approximately in accordance with the rough timing, and the machine would be cycled. If the light 146 and the selected one of the indicator lights 148 and 150 would come on at the same time, then the timer 136 would have been set properly. Otherwise, the timer 136 would have to be adjusted and the machine would have to be re-cycled. Eventually, the lights would come on simultaneously, and the timer would read the feed rate directly.

It now will be apparent that I have herein shown and described a tool feed timer for use in setting or checking the rate of feed of a machine tool. This timer is of inestimable value in arriving at proper feed rates so as to avoid damage to the tool, and so as to achieve the highest rate of production consistent with high quality and long tool life. My tool feed timer is of rugged construction, and is simple to use.

The specific example herein shown and described will be understood as being illustrative, both as to the structure of the invention, and as to the machine tool with which it can be used. Various changes in structure are possible, and are to be understood as forming a part of my invention insofar as such changes come within the spirit and scope of the appended claims.

I claim:

1. A timing device for timing tool feed rate comprising a base, movable means on said base adapted to be engaged by a moving part on a machine for movement in accordance with the feed rate of said machine, said base being mounted on a fixed part of said machine, a timer carried by said base, means operatively interconnecting said movable means and said timer for starting operation of said timer upon a predetermined movement of said movable means, means associated with said timer providing a perceivable indication following a predetermined elapsed time, further indication providing means, and means operatively interconnecting said movable means and said further indication providing means for providing a further perceivable indication upon a predetermined movement of said movable means whereby movement of said movable means can be compared with elapsed time.

2. A timing device as set forth in claim 1 wherein both of said indicating means provide a visible indication.

3. A timing device as set forth in claim 2 wherein the indicating means comprise lights.

4. A timing device as set forth in claim 1 wherein the timer is adjustable whereby an indication is provided following an adjustably predetermined elapsed time.

5. A device for timing tool feed rate comprising a base adapted to be mounted on a machine, movable means on said base adapted to be engaged by a moving part on a machine for movement in accordance with the tool feed rate of said machine, a timer carried by said base, means operatively interconnecting said movable means and said timer for starting operation of said timer upon a predetermined movement of said movable means, means associated with said timer providing an indication following a predetermined elapsed time, further indication providing means, and means operatively interconnecting said movable means and said further indication providing means for providing an indication upon a selectively predetermined movement of said movable means whereby movement of said movable means can be compared with elapsed time.

6. A timing device as set forth in claim 5 wherein the further indication providing means comprises a plurality of indicators and the means interconnecting the movable means and the further indication providing means comprises a like plurality of connectors each operable upon a different predetermined movement of the movable means, and means for selecting which of said plurality of indicators will provide and indication.

7. A device for timing tool feed rate comprising a base adapted to be mounted on a fixed part of a machine, a movable plunger on said base adapted to be engaged by a moving part on said machine for movement in accordance with the feed rate of said machine, means resisting movement of said plunger, a timer carried by said base, indicating means, and means operatively interconnecting said indicating means with said movable plunger and with said timer for indicating the tool feed rate of said machine.

8. A device for timing tool feed rate comprising a base, said base being adapted for mounting on a fixed part of a machine, movable means carried from said base and adapted to be engaged by a moving part on said machine for movement in accordance with the feed rate of said machine, a timer carried by said base, means operatively interconnecting said movable means and said timer for starting operation of said timer upon a predetermined movement of said movable means, means associated with said timer providing an indication following a predetermined elapsed time, further indication providing means, means operatively interconnecting said movable means and said further indication providing means for providing a further indication upon a predetermined movement of said movable means whereby movement of said movable means can be compared with elasped time, and means for automatically returning the movable means to its rest position.

9. A device for timing tool feed rate comprising a base adapted to be mounted on a fixed part on a machine, a plunger carried on said base for axial movement and adapted to be engaged by a moving part on said machine for movement in accordance with the feed rate of said machine, a timer carried by said base, means operatively interconnecting said plunger and said timer for starting operation of said timer upon a predetermined movement of said plunger, means associated with said timer providing an indication following a predetermined elapsed time, further indication providing means, and means interconnecting said plunger and said further indication providing means for providing a further indication upon a predetermined movement of said plunger whereby movement of said plunger can be compared with elapsed time.

10. A timer as set forth in claim 9 and further including spring means biasing said plunger toward a given position, said plunger being moved against said spring means by the moving part on said machine.

11. A timing device as set forth in claim 9 wherein the means operatively connecting the plunger and the further indication providing means comprises cam means on said plunger and cam follower means carried from said base.

12. A device for timing tool feed rate comprising a housing, a plunger extending outwardly through said housing and limited in outward movement, spring means within said housing urging said plunger outwardly thereof, said plunger being movable inwardly of said housing against the force of said spring means, said plunger having a plurality of cam sections thereon, a plurality of cam followers carried within said housing and engageable with the cam sections on said plunger, a timer carried by said housing, means connecting one of the cam followers with said timer for starting said timer in operation upon a predetermined inward movement of said plunger, an indicator light energized through said timer following a predetermined lapsed time, a plurality of additional indicator lights, and means individually connecting said additional indicator lights with said cam followers for causing illumination of said additional indicator lights following predetermined inward movement of said plunger whereby a selected one of said additional indicator lights can be compared with the first mentioned indicator light for timing the movement of said plunger.

13. A device for timing tool feed rate comprising a base adapted to be mounted on a machine, means on said base adapted to be engaged by a moving part on such machine in accordance with the tool feed rate of such machine, timing means carried by said base, means operatively connecting said engaged means and said timing means for causing said timing means to start a timing operation, indicating means operatively connected to said engaged means for providing an indication of movement of the machine moving part, and means operable by said timing means for interpreting said indicating means in accordance with elapsed time.

14. A device as set forth in claim 13 wherein the engaged means comprises a member movable with the machine part.

15. A device as set forth in claim 13 wherein the interpreting means comprises an additional indicating means.

16. A device as set forth in claim 15 wherein both of said indicating means comprise lights.

References Cited in the file of this patent

UNITED STATES PATENTS

| | | |
|---|---|---|
| 2,509,693 | Morrison | May 30, 1950 |
| 2,617,866 | Ballantine | Nov. 11, 1952 |
| 2,629,290 | Staples | Feb. 24, 1953 |
| 2,706,288 | Lindholm | Apr. 12, 1955 |